(12) United States Patent
Aull et al.

(10) Patent No.: US 9,424,225 B2
(45) Date of Patent: *Aug. 23, 2016

(54) DRIVER INTERFACE FUNCTIONS TO INTERFACE CLIENT FUNCTION DRIVERS

(71) Applicant: Microsoft Technology Licensing, LLC, Redmond, WA (US)

(72) Inventors: Randall E. Aull, Kenmore, WA (US); Doron J. Holan, Seattle, WA (US); Mukund Sankaranarayan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/703,812

(22) Filed: May 4, 2015

(65) Prior Publication Data

US 2015/0317278 A1 Nov. 5, 2015

Related U.S. Application Data

(60) Division of application No. 13/959,482, filed on Aug. 5, 2013, now Pat. No. 9,043,497, which is a continuation of application No. 13/464,282, filed on May 4, 2012, now Pat. No. 8,504,739, which is a continuation of application No. 12/687,775, filed on Jan. 14, 2010, now Pat. No. 8,200,853.

(51) Int. Cl.
*G06F 3/00* (2006.01)
*G06F 13/12* (2006.01)
(Continued)

(52) U.S. Cl.
CPC ....... *G06F 13/4282* (2013.01); *G06F 9/44505* (2013.01); *G06F 9/544* (2013.01); *G06F 9/545* (2013.01); *G06F 13/102* (2013.01)

(58) Field of Classification Search
None
See application file for complete search history.

(56) References Cited

U.S. PATENT DOCUMENTS

| 5,951,667 A | 9/1999 | Abramson |
| 6,832,273 B2 | 12/2004 | Ray et al. |

(Continued)

FOREIGN PATENT DOCUMENTS

| CN | 101383621 | 3/2009 |

OTHER PUBLICATIONS

"Foreign Office Action", CN Application No. 201180006002.6, May 27, 2014, 11 pages.

(Continued)

*Primary Examiner* — David E Martinez
(74) *Attorney, Agent, or Firm* — Judy Yee; Micky Minhas

(57) ABSTRACT

In embodiments of driver interface functions to interface client function drivers, a set of serial communication protocol driver interfaces are exposed by a core driver stack, and the serial communication protocol driver interfaces include driver interface functions to interface with client function drivers that correspond to client devices configured for data communication in accordance with the serial communication protocol. A client function driver can check for the availability of a driver interface function before interfacing with the core driver stack via the serial communication protocol driver interfaces. A contract version identifier can also be received from the client function driver via an extension of the driver interface functions, where the contract version identifier indicates a set of operation rules by which the client function driver interfaces with the core driver stack.

20 Claims, 5 Drawing Sheets

(51) Int. Cl.
*G06F 13/42* (2006.01)
*G06F 9/445* (2006.01)
*G06F 9/54* (2006.01)
*G06F 13/10* (2006.01)

(56) References Cited

U.S. PATENT DOCUMENTS

| | | |
|---|---|---|
| 7,275,118 B2 | 9/2007 | Ytterstrom |
| 7,522,659 B2 | 4/2009 | Lacy |
| 7,912,987 B2 | 3/2011 | Zhong et al. |
| 8,200,853 B2 | 6/2012 | Aull |
| 8,504,739 B2 | 8/2013 | Aull et al. |
| 9,043,497 B2 | 5/2015 | Aull et al. |
| 2003/0208643 A1 | 11/2003 | Ferguson |
| 2004/0254014 A1 | 12/2004 | Quraishi et al. |
| 2005/0160196 A1 | 7/2005 | Dutton |
| 2005/0246723 A1 | 11/2005 | Bhesania |
| 2006/0161617 A1 | 7/2006 | Zhong et al. |
| 2006/0161912 A1* | 7/2006 | Barrs .................. G06F 13/102 717/170 |
| 2008/0235520 A1 | 9/2008 | Becker et al. |
| 2009/0006658 A1 | 1/2009 | Gough |
| 2011/0173351 A1 | 7/2011 | Aull |
| 2012/0221751 A1 | 8/2012 | Aull |
| 2013/0326543 A1 | 12/2013 | Aull |

OTHER PUBLICATIONS

"International Search Report and Written Opinion", Application No. PCT/US2011/020101, Aug. 29, 2011, 10 pages.
"Non-Final Office Action", U.S. Appl. No. 12/687,775, Sep. 7, 2011, 9 pages.
"Non-Final Office Action", U.S. Appl. No. 13/464,282, Sep. 27, 2012, 5 pages.
"Non-Final Office Action", U.S. Appl. No. 13/959,482, Sep. 19, 2014, 10 pages.
"Notice of Allowance", U.S. Appl. No. 12/687,775, Feb. 10, 2012, 6 pages.
"Notice of Allowance", U.S. Appl. No. 13/464,282, Apr. 1, 2013, 7 pages.
"Notice of Allowance", U.S. Appl. No. 13/959,482, Jan. 22, 2015, 8 pages.
"Restriction Requirement", U.S. Appl. No. 12/687,775, Jul. 12, 2011, 5 pages.
"Restriction Requirement", U.S. Appl. No. 13/464,282, Aug. 17, 2012, 6 pages.
"USBIO Com Interface Reference Manual", Version 2.50, Thesycon Systemsoftware & Consulting GmbH, Nov. 16, 2009, 142 pages.
"USBIO for Windows CE and Windows Mobile", Retrieved from http://www.thesycon.de/eng/usbio.shtml on Aug. 18, 2009, Nov. 14, 2004, 3 pages.
Sharp,"Installing a Custom Kernel with USB 3.0", Retrieved from: <http://sarah.thesharps.us/> on Aug. 18, 2009, Jun. 9, 2009, 4 pages.

* cited by examiner

DRIVER INTERFACE FUNCTIONS TO INTERFACE CLIENT FUNCTION DRIVERS

RELATED APPLICATIONS

This application is a divisional of and claims priority to U.S. patent application Ser. No. 13/959,482 filed Aug. 5, 2013 entitled "Driver Interface Functions to Interface Client Function Drivers", the disclosure of which is incorporated by reference herein in its entirety. application Ser. No. 13/959,482 is a continuation of and claims priority to application Ser. No. 13/464,282 filed May 4, 2012 entitled "USB Driver Interface Functions to Interface USB Client Function Drivers", the disclosure of which is incorporated by reference herein in its entirety. application Ser. No. 13/464,282 is a continuation of and claims priority to U.S. Pat. No. 8,200,853 filed Jan. 14, 2010 entitled "Extensions for USB Driver Interface Functions", the disclosure of which is incorporated by reference herein in its entirety.

BACKGROUND

Computer devices are typically implemented to utilize USB (Universal Serial Bus) which is a communication link for data communication within and between computer devices and/or external peripheral devices, such as a computer mouse, keyboard, printer, display device, digital camera, and the like. A computer device may have several USB ports via which a peripheral device is connected by a USB cable. Generally, a peripheral device that is integrated with, or connected to, a computer device has a corresponding set of device drivers that discover, enumerate, and communicate with the peripheral device, such as to receive and/or communicate data and instructions. The computer device implements a USB core driver stack that exposes APIs (Application Program Interfaces), and the device drivers for the peripheral device interface with the APIs to request processor operations and/or data exchange.

SUMMARY

This summary is provided to introduce simplified concepts of extensions for USB driver interface functions that are further described below in the Detailed Description. This summary is not intended to identify essential features of the claimed subject matter, nor is it intended for use in determining the scope of the claimed subject matter.

Extensions for USB driver interface functions are described. In embodiments, input/output of computer instructions and data exchange is managed in a USB core driver stack. A set of USB driver interfaces are exposed by the USB core driver stack, and the USB driver interfaces include USB driver interface functions that interface with USB client function drivers that correspond to client USB devices. Extensions for the USB driver interface functions are also exposed by the USB core driver stack to interface with the USB client function drivers. In various embodiments, the extensions for the USB driver interface functions can be implemented to interface the USB core driver stack with legacy, new, and future versions of the USB client function drivers.

In other embodiments, a composite device driver registers itself for the individual functions of the client USB devices. The USB core driver stack enumerates the USB client function drivers and generates function handles that each correspond to an individual function of a client USB device. The USB core driver stack can then identify a USB client function driver that causes a runtime failure by a function handle that corresponds to the individual function of the client USB device that is associated with the USB client function driver. The composite device driver can also notify the USB core driver stack that the composite device driver will control suspending individual functions of a client USB device.

In other embodiments, the USB core driver stack can receive a capability version request from a USB client function driver, and return an indication that the USB core driver stack supports the extensions for the USB driver interface functions. The USB core driver stack can also receive a contract version identifier from a USB client function driver via an extension of the USB driver interface functions. The contract version identifier indicates a set of operation rules by which the USB client function driver interfaces with the USB core driver stack. Additionally, a check first protocol can be enforced that directs a USB client function driver to check for availability of a USB driver interface function before interfacing with the USB core driver stack via the USB driver interfaces.

In other embodiments, the USB core driver stack includes a USB host controller that supports buffered data stored in virtually non-contiguous buffers. Additionally, the USB core driver stack can allocate multiple data stream queues to an endpoint for input/output, and manage the input/output of the multiple data stream queues.

BRIEF DESCRIPTION OF THE DRAWINGS

Embodiments of extensions for USB driver interface functions are described with reference to the following drawings. The same numbers are used throughout the drawings to reference like features and components.

DETAILED DESCRIPTION

Embodiments provide that extensions to USB driver interface functions can be exposed by a USB core driver stack to provide new capabilities and interface the USB core driver stack with legacy, new, and future versions of USB client function drivers. The extensions for the USB driver interface functions provide any one or more of, but are not limited to, the features of registering and unregistering a composite function driver for a client USB device; setting USB function handle data for a composite function driver that includes multiple functions; negotiating a USB interface version for new, current, and/or legacy compatibility between a USB client function driver and the USB core driver stack; checking USB stack capability implementation to determine the capabilities of the USB core driver stack before utilizing a USB driver interface function; supporting buffered data that is stored in virtually non-contiguous buffers; and allocating multiple data stream queues to an endpoint which provides for bulk endpoints and multiple input/output queues to be associated to an endpoint.

While features and concepts of the described systems and methods for extensions for USB driver interface functions can be implemented in any number of different environments, systems, and/or various configurations, extensions for embodiments of USB driver interface functions are described in the context of the following example systems and environments.

Figure 1:
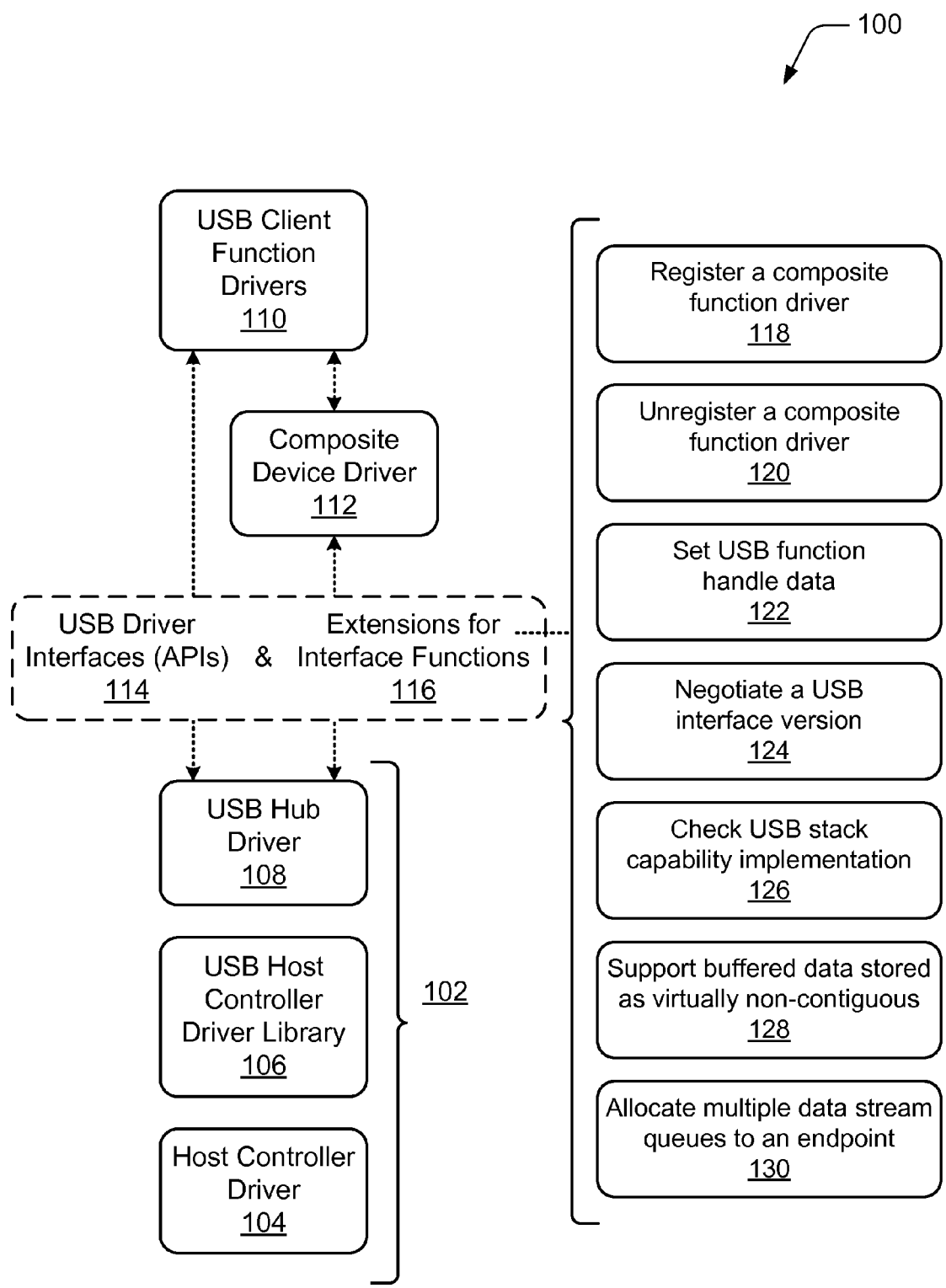
FIG. 1 illustrates an example system in which embodiments of extensions for USB driver interface functions can be implemented.

FIG. 1 illustrates an example system 100 in which various embodiments of extensions for USB driver interface functions can be implemented. System 100 includes a USB core driver stack 102 (e.g., also referred to as a USB stack) that represents one or more USB core driver stacks in various device implementations. The USB core driver stack 102 manages input/output of computer instructions and data exchange in a computer system, such as in a computer device that implements the example system 100. In this example, the USB core driver stack 102 includes various components, such as a host controller driver (HCD) 104, a USB host controller driver library 106, and a USB hub driver 108. The USB host controller driver library 106 is implemented as code that may be common to all USB host controller drivers to interface with the rest of the USB core driver stack. Additionally, the USB host controller driver library 106 may also be referred to as a USB host controller class extension (UCX).

The example system 100 also includes USB client function drivers 110, and in various embodiments, a composite device driver 112. The USB client function drivers 110 correspond to one or more client USB devices, and represent any of various USB function, class, and/or client drivers that utilize APIs to interface with the USB core driver stack 102 to interact with the corresponding client USB devices. The USB core driver stack 102 implements a set of USB driver interfaces (APIs) 114 that are exposed by the USB core driver stack to the USB client function drivers 110. The USB driver interfaces 114 may also be referred to as DDIs (Device Driver Interfaces). The USB core driver stack 102 also exposes extensions 116 for the USB driver interface functions, and the extensions are exposed to interface with the USB client function drivers 110.

In various embodiments, the composite device driver 112 may be implemented as a USB CCGP (Common Class Generic Parent) that exposes separate functions of a client USB device such that the separate functions can each be treated as separate devices themselves. A USB client function driver 110 is associated with each function to drive the corresponding function on the client USB device. In some implementations, the composite device driver 112 may be transparent to the USB client function drivers 110 and/or input/output is routed through the composite device driver. Alternatively, the USB client function drivers 110 can interface directly with the USB core driver stack 102 via the USB driver interfaces 114 and/or via the extensions 116 for the USB driver interface functions.

In various embodiments, the extensions 116 for the USB driver interface functions include, but are not limited to, extensions to register a composite function driver 118, such as a composite USB client function driver; unregister a composite function driver 120, such as a USB client function driver; set USB function handle data 122, such as for a composite USB client function driver 110 that includes multiple functions; negotiate a USB interface version 124, such as for new, current, and/or legacy compatibility between a USB client function driver 110 and the USB core driver stack 102; check USB stack capability implementation 126, such as to determine the capabilities of the USB core driver stack 102 before utilizing a USB driver interface function; support an implementation 128 for buffered data that is stored in virtually non-contiguous buffers; and allocate multiple data stream queues to an endpoint 130 which provides for bulk endpoints and multiple input/output queues to be associated to an endpoint.

The various components of example system 100, such as the USB core driver stack 102, the USB client function drivers 110, the composite device driver 112, the USB driver interfaces 114, and the extensions 116 for the USB driver interface functions can be implemented as computer-executable instructions and executed by one or more processors to implement the various embodiments and/or features described herein. In addition, the example system 100 can be implemented with any number and combination of differing components as further described with reference to the example device shown in FIG. 6.

In embodiments, function handles are generated so that the USB core driver stack 102 can identify from which of the USB client function drivers 110 a particular request is received, and to enforce and track behavior that is specific to the USB client function drivers. The composite device driver 112 is implemented to distinguish the separate functions of a client USB device so that a separate USB client function driver 110 can be associated with each separate function. The function handles provide the USB core driver stack 102 an identification of each separate USB client function driver 110, which in an implementation, is represented by a physical device object (PDO) in memory. A function handle then represents a device object and information can be associated with the function handle, such as a driver name. In an implementation, the USB core driver stack 102 can identify a USB client function driver 110 that causes a runtime failure or other system crash.

In current implementations, a parameter for USB device handle is allotted by the USB hub before a particular request is sent down the USB stack. This provides identification of single function devices when input/output requests are received from the same USB driver that is identified by the USB device handle. However, for composite functioning devices, the USB device handle is then associated with the composite device driver 112 (e.g., a USB CCGP in some implementations), and a USB client function driver 110 that is responsible for a particular input/output request is not identifiable to the USB core driver stack.

Therefore, a parameter for USB function handle is implemented and a handle is generated for each function or representation of a function, such as a physical device object (PDO) that is created by the composite device driver 112 in one implementation. This registration mechanism also enables implementation of contracts, versioning, verification, and other features for any of the interfaces and/or the extensions of the USB driver interface functions. When the composite device driver 112 determines a number of driver functions, it requests the function handles for each of the functions. The handles can then be generated by the USB core driver stack 102, and the composite device driver 112 can populate every input/output request for a USB client function driver 110 with the corresponding function handle when communicated down the USB stack.

The extension for the USB driver interface functions to register a composite driver is IOCTL_INTERNAL_USB_REGISTER_COMPOSITE_DRIVER. This IOCTL (e.g., referred to generally as a device input/output control for various, different operating system implementations) is sent by the composite device driver 112 (e.g., a USB CCGP or equivalent driver) after a determination is made as to the number of driver functions of a composite driver. An example of this IOCTL definition is:

```
#define
IOCTL_INTERNAL_USB_REGISTER_COMPOSITE_DRIVER \
    CTL_CODE (FILE_DEVICE_USB, \
    USB_REGISTER_COMPOSITE_DRIVER, \
    METHOD_NEITHER, \
    FILE_ANY_ACCESS)
```

A USB client function driver 110 passes two parameters for this IOCTL, one for input and one for output. The input parameter is a caller allocated and an initialized USB_COMPOSITE_REGISTRATION structure. The output parameter is a caller allocated array of USBD_FUNCTION_HANDLES, the size of which is determined by a FunctionCount field of the USB_COMPOSITE_REGISTRATION structure. An example of the USB_COMPOSITE_REGISTRATION structure is:

```
typedef struct USB_COMPOSITE_REGISTRATION {
    USHORT  Version;
    USHORT  Size;
    ULONG   CapabilityFlags;
    ULONG   FunctionCount;
} USB_COMPOSITE_REGISTRATION,*PUSB_COMPOSITE_REGISTRATION;
```

The Version field is the version of the structure and can be used for future extensibility. The Size field is the size of the structure USB_COMPOSITE_REGISTRATION in bytes and can be used for structure versioning. The CapabilityFlags field is used for the composite driver to identify its supported capabilities, such as a defined capability for CompositeCapabilityFunctionSuspend. The FunctionCount field identifies the number of driver functions, and in one implementation, correlates to the number of PDOs that the composite driver will create.

If a client driver sends this IOCTL without first determining that the support USB Interface version supports it, the IOCTL will complete with an error status, such as STATUS_INVALID_PARAMETER, STATUS_INVALID_DEVICE_REQUEST, or other such statuses that indicate an error. If the IOCTL completes successfully, then the function handles returned in the output parameter are all valid. If the client driver sends this IOCTL more than once, the completion code will be STATUS_INVALID_DEVICE_REQUEST or other such status indicating error. If the Size field is greater than any size supported by the USB stack, then the request will complete with STATUS_LENGTH_INFO_MISMATCH and the Size field will be updated to the largest size that is supported by the USB core driver stack.

The following is an example function that can be utilized to initialize the USB_COMPOSITE_REGISTRATION structure.

```
UsbBuildCompositeRegistration (
    __in    ULONG                       CapabilityFlags,
    __in    ULONG                       FunctionCount,
    __out   PUSB_COMPOSITE_REGISTRATION
            CompositeRegistration,
    )
```

-continued

```
{
    RtlZeroMemory (CompositeRegistration,
                sizeof (USB_COMPOSITE_REGISTRATION);
    CompositeRegistration->Version = 0x0100;
    CompositeRegistration->Size = sizeof
    (USB_COMPOSITE_REGISTRATION);
    CompositeRegistration->CapabilityFlags = CapabilityFlags;
    CompositeRegistration->FunctionCount = FunctionCount;
}
```

The composite device driver 112 can send this IOCTL to the USB core driver stack 102 to retrieve the function handles for each of the functions or representations of the functions, such as PDOs. After performing a version exchange, and determining the number of functions, the composite device driver sends this IOCTL down the USB stack. When the composite device driver has retrieved the function handles, it can then add them to all requests from a corresponding USB client function driver going down the USB stack.

When the USB hub driver 108 receives this IOCTL, it can first perform parameter validations, including determining if the client driver has already registered itself. Assuming that the IOCTL's input buffer is well formed, the USB hub driver can register or save that a composite driver correlates to a particular function and what the capabilities are. It can then forward the request down the USB stack. As the request is completing back up the USB stack, the hub driver can cache the function handles to preserve compatibility with specific drivers. In an implementation, the function handles may be real pointers, and the hub driver performs a lookup of all the function handles to determine which function is associated with which handle. If, however, the function handle is an index (or converted into one), then it can use that to index into an array, or other structure that may be implemented for use with an index, such as a virtual address where the value is multiple indices in various offsets into the value.

The extension for the USB driver interface functions to unregister a composite driver is IOCTL_INTERNAL_USB_UNREGISTER_COMPOSITE_DRIVER. This IOCTL is the opposite of IOCTL_INTERNAL_USB_REGISTER_COMPOSITE_DRIVER (the register IOCTL) as described above, and is used to clean-up function handles. An example of this IOCTL definition is:

```
#define
IOCTL_INTERNAL_USB_UNREGISTER_COMPOSITE_DRIVER \
    CTL_CODE (FILE_DEVICE_USB, \
    USB_REGISTER_COMPOSITE_DRIVER, \
    METHOD_NEITHER, \
    FILE_ANY_ACCESS)
```

There are no parameters provided by a USB client function driver 110 for this IOCTL. If a client driver communicates this IOCTL without first completing an IOCTL_INTERNAL_USB_REGISTER_COMPOSITE_DRIVER request, the IOCTL will complete with an error status, such as STATUS_INVALID_PARAMETER, STATUS_INVALID_DEVICE_REQUEST, or other such statuses that indicate an error. The composite device driver 112 can send this IOCTL to close any function handles that were previously opened, and in an implementation, this operation can be performed in Release Hardware. When the USB hub driver 108 receives this IOCTL, it can first perform a parameter validation, including determining if the client driver is already registered itself. Assuming the IOCTL is well formed, the USB hub driver can register or save that the composite driver has unregistered itself and will clean-up any related state. It can then forward the request down the USB stack. The USB hub driver can also free the array of structures representing the functions, if implemented.

The extension for the USB driver interface functions to set USB function handle data is IOCTL_INTERNAL_USB_SET_FUNCTION_HANDLE_DATA. This IOCTL is sent by the composite device driver 112 after completion of the composite driver registration. An example of this IOCTL definition is:

```
#define
IOCTL_INTERNAL_USB_SET_FUNCTION_HANDLE_DATA \
    CTL_CODE (FILE_DEVICE_USB, \
    USB_REGISTER_COMPOSITE_DRIVER, \
    METHOD_NEITHER, \
    FILE_ANY_ACCESS)
```

The input parameter exposed to USB client function drivers for this IOCTL is a caller allocated and initialized USB_FUNCTION_DATA structure. An example USB_FUNCTION_DATA structure is:

```
typedef struct USB_FUNCTION_DATA {
        USHORT                  Version;
        USHORT                  Size;
        USBD_FUNCTION_HANDLE    UsbdFunctionHandle;
        PDEVICE_OBJECT          PhysicalDeviceObject;
}       USB_FUNCTION_DATA, *PUSB_FUNCTION_DATA;
```

The Version field is the version of the structure and can be used for future extensibility. The Size field is the size of the structure USB_FUNCTION_DATA in bytes and can be used for structure versioning. The UsbdFunctionHandle is the function handle previously retrieved in an IOCTL_INTERNAL_USB_REGISTER_COMPOSITE_DRIVER request. The PhysicalDeviceObject is the physical device object created by the composite device driver for the function associated with the specified function handle.

If a client driver sends this IOCTL without first successfully retrieving the function handles, the IOCTL will complete with an error status, such as STATUS_INVALID_PARAMETER, STATUS_INVALID_DEVICE_REQUEST, or other such statuses that indicate an error. If the Size field is greater than any supported size by the USB stack, the request will complete with STATUS_LENGTH_INFO_MISMATCH and the Size field will be updated to the largest supported by the USB core driver stack.

The following is an example function that can be utilized to initialize the USB_FUNCTION_DATA structure.

The composite device driver 112 can send this IOCTL to inform the rest of the USB core driver stack 102 of the function associated with the device object. This can be used by the USB stack for diagnostic purposes. When the USB hub driver 108 receives this IOCTL, it can first perform parameter validations, including determining if the client driver has already registered itself. Assuming the input parameters for this IOCTL are well formed, the USB hub driver can save the PDO in the structure and associate it with the function handle.

In various embodiments, the USB core driver stack 102 is implemented to receive a contract version identifier from a USB client function driver 110 via an extension of the USB driver interface functions. The contract version identifier indicates a set of operation rules by which the USB client function driver interfaces with the USB core driver stack, which uses the contract version identifier to maintain compatibility with legacy or previous version client drivers. In an implementation, a client driver can determine how to function if loaded on a USB stack that does not support the extensions for the USB driver interfaces.

A USB client function driver 110 can query to the USB core driver stack to determine whether the USB stack supports the extensions 116 for the USB driver interfaces (APIs) 114. An IOCTL can be implemented to negotiate a specific interface version with the USB core driver stack 102. This allows a client driver to determine what features the stack supports, as well as allow the stack to enforce specific interface contracts. Additionally, the interfaces can be backwards compatible and an API version that a client driver was built and tested with can be determined. This allows interface upgrades while being able to mitigate legacy compatibility issues. Existing USB version information can be retrieved via the GetUSBDIVersion function call. Designators can be added to distinguish between a legacy USB stack and a new USB stack for a given operating system.

An example implementation of an extension for the USB driver interface functions to obtain and/or negotiate a USB interface version is IOCTL_INTERNAL_USB_NEGOTIATE_INTERFACE_VERSION. Alternatively, a different mechanism can be implemented for a USB client function driver to determine if the USB core driver stack supports the new interface. This can be implemented through IRP_MN_QUERY_INTERFACE when specifying an appropriate interface structure that can include the contract version of the client driver.

A USB client function driver 110 can be required to issue the IOCTL prior to issuing any URBs or other IOCTLs down the USB core driver stack, but after passing down IRP_MN_START_DEVICE to its physical device object and having the start request complete successfully back to the client driver. In an implementation, this IOCTL is the first operation performed within a client driver's EvtDevicePrepareHardware routine (if KMDF based), or IRP_MN_START_DEVICE completion routine (if WDM based). If a client does not issue this IOCTL prior to issuing any URBs, then

```
UsbBuildFunctionData (
        __in    USBD_FUNCTION_HANDLE    UsbdFunctionHandle,
        __in    PDEVICE_OBJECT          PhysicalDeviceObject,
        __out   PUSB_FUNCTION_DATA      FunctionData,
        )
{
    RtlZeroMemory (FunctionData, sizeof (USB_FUNCTION_DATA));
    FunctionData ->Version = 0x0100;
    FunctionData ->Size = sizeof (USB_FUNCTION_DATA);
    FunctionData ->UsbdFunctionHandle = UsbdFunctionHandle;
    FunctionData ->PhysicalDeviceObject = PhysicalDeviceObject;
}
``` it can be assumed to be compatible with a legacy USB interface. An attempt by a client driver to access new USB interface features will fail if the client driver's compatible interface version is of a lower version before new features are introduced. This can be utilized to enforce that client drivers send accurate version information.

An example of this IOCTL definition is:

```
#define
IOCTL_INTERNAL_USB_NEGOTIATE_INTERFACE_VERSION \
    CTL_CODE (FILE_DEVICE_USB, \
    USB_EXCHANGE_VERSION, \
    METHOD_NEITHER, \
    FILE_ANY_ACCESS)
```

The input parameter exposed to client drivers for this IOCTL is a USB_EXTENDED_VERSION_INFORMATION structure which is allocated and initialized by a client driver. An example USB_EXTENDED_VERSION_INFORMATION structure is:

```
typedef Struct USB_EXTENDED_VERSION_INFORMATION {
        USHORT          Version;
```

-continued

```
        USHORT          Size;
        ULONG           USBInterfaceVersion;
        PVOID           UsbdDeviceHandle;
}       USB_EXTENDED_VERSION_INFORMATION,
        *PUSB_EXTENDED_VERSION_INFORMATION;
```

The Version field is the version of the structure and can be used for future extensibility. The client driver provides the version prior to communicating the IOCTL down the USB stack. Note that this is different than the USBDIVersion returned through the GetUSBDIVersion API. The Size field is the size of the structure in bytes, and can be used in the future to extend the structure. The client driver provides the size prior to communicating the IOCTL down the USB stack. The USBInterfaceVersion is the version number for the interface contract that the client driver would like to use. The client driver provides this version prior to communicating the IOCTL down the USB stack. The UsbdDeviceHandle is reserved for use by the core stack (and is not used by the client driver).

If the client driver sends this IOCTL to a legacy stack, it will complete with the same status that was set when the IRP was sent. The client driver can initialize a status other than STATUS_SUCCESS before sending the IRP. If the IOCTL completes successfully, then the USB core driver stack supported the requested interface version and can now enforce the contract for that version. If the client driver sends this IOCTL more than once, or sends it after another IOCTL or URB, the completion code will be STATUS_INVALID_DEVICE_REQUEST or other such status indicating error.

In an implementation, if a legacy composite device driver (e.g., a USB CCGP in an implementation) is loaded on a newer version USB stack with newer version USB drivers loaded as its children, this scenario can occur and legacy compatibility maintained, in which case an error code consistent with that behavior is returned. Alternatively, this may not be implemented if the different mechanism is utilized for a USB client function driver to determine whether the USB core driver stack supports the new interface, such as through IRP_MN_QUERY_INTERFACE. If the Size field is greater than any supported sizes by the USB stack, then the request will complete with STATUS_LENGTH_INFO_MISMATCH and the Size field will be updated to the largest supported by the USB core driver stack. If the USBInterfaceVersion is not supported by the USB core driver stack, then the IRP can be completed with the same status that was in the IRP when it was sent.

The following is an example function that can be utilized to initialize the USB_EXTENDED_VERSION_INFORMATION structure.

```
UsbBuildVersionInformation (
    __in    ULONG                               InterfaceVersion,
    __out   PUSB_EXTENDED_VERSION_INFORMATION   VersionInformation,
    )
{
    RtlZeroMemory (VersionInformation,
            sizeof (USB_EXTENDED_VERSION_INFORMATION));
    VersionInformation ->Version = 0x0100;
    VersionInformation->Size =
            sizeof(USB_EXTENDED_VERSION_INFORMATION);
    VersionInformation ->InterfaceVersion = InterfaceVersion;
}
```

The composite device driver 112 is the function driver for a composite device, and therefore has two responsibilities for this IOCTL. As the function driver, the composite device driver communicates the IOCTL, and as a data bus driver, the composite device driver handles the IOCTL. After the composite device driver has passed the first IRP_MN_START_DEVICE down the USB stack and it has completed back to the driver (if it is WDM), or within EvtDevicePrepareHardware callback (if it is KMDF), the first operation will be to send this version IOCTL.

The composite device driver 112 can also be implemented to validate that the USB core driver stack version number is the same as what the composite device driver has been tested with and fail start otherwise, as this would indicate an intra-stack binary version mismatch. As a data bus driver, the composite device driver receives this IOCTL and populates the UsbdFunctionHandle so that the lower stack knows which specific function this request is associated with. If the composite device driver receives any other URB prior to receiving this IOCTL, it can assume that the client's interface version is a legacy version. If the composite device driver receives this IOCTL after any other URB or IOCTL (except an unsuccessful interface negotiation IOCTL), it will fail the IOCTL. If a client driver's supported version number is greater than the one supported by the USB stack, the composite device driver can fail the request. If the version is supported by composite device driver, it can forward the request down the USB stack, and if the request completes successfully, the composite device driver can save the version number and use that to enforce behavior.

The USB hub driver 108 also has responsibilities for versioning. When the hub driver receives this IOCTL, it can populate the USBDeviceHandle field so that the lower USB stack knows which device this version information is for. If the USB hub driver receives any other URB prior to receiving this IOCTL, it can assume that a client driver's interface version is the legacy version. If the hub driver receives this IOCTL after any other URB or IOCTL (except an unsuccessful interface negotiation IOCTL), it will fail the IOCTL. If the interface is not supported by the hub driver, it will fail the IOCTL. If the interface is supported by the hub driver, it can forward the request to the root hub PDO for the USB host controller driver to handle. On completion, and if the request was successful, the hub driver can save the client driver's version information and use it to enforce behavior.

The class extension can receive the IOCTL on the root hub PDO. If the version number is supported by the class extension (and controller driver), it will save a client driver's version information in the USB Device object. It will also inform the host controller driver of the client driver's version information. The class extension can then populate the rest of the fields in the data structure (and clear out the device handle, reserved, etc. fields) and complete the IOCTL. If a client driver's supported version number is not supported by the USB stack, the class extension can be implemented to fail the IOCTL. The USB host controller driver can be notified by the class extension of a client driver's interface version associated with a device handle, and the client driver can save this data and use it to enforce behavior.

In various embodiments, the USB core driver stack 102 is implemented to receive a capability version request from a USB client function driver 110, and return an indication that the USB core driver stack supports the extensions 116 for the USB driver interface functions. In other embodiments, the USB core driver stack 102 is implemented to receive a request from a USB client function driver 110 to allocate an URB (USB request block), and the USB core driver stack 102 can allocate the URB for the USB client function driver. The USB core driver stack 102 can also enforce a check first protocol that directs a USB client function driver 110 to check for availability of USB driver interface function before interfacing with the USB core driver stack via the USB driver interfaces. In an implementation of replacement for the version negotiation IOCTL, the version data can then be propagated in the URB itself to provide driver specific compatibility.

There may be some capabilities that only certain types of host controllers support, or only support with specific device versions and/or speeds. An example of this is Bulk Stream endpoints. To implement the streams feature of extensions for USB driver interface functions, several requirements are enabled, such as the USB stack is implemented to support the streams concept, and the USB host controller, as well as the bus technology, is implemented to support the stream feature. A client driver also determines if all of the requirements are met to enable streams.

A generic mechanism can be defined to determine USB capabilities from the USB core driver stack so that different combinations of capabilities can be supported on different USB stacks without an update the USBDInterfaceVersion. The USB core driver stack provides access to certain features only if a client driver requests the appropriate capability, and this provides that a client driver will function on other USB stacks as well without being confined to a specific USB stack version and controller. In an implementation, verifier settings can be implemented to disable capabilities so that a client driver functions when capabilities are not supported.

An example implementation of an extension for the USB driver interface functions to determine USB capabilities, or to determine whether features of the extensions for the interface functions are enabled, is IOCTL_INTERNAL_USB_GET_USB_CAPABILITY. This IOCTL is sent by a USB client function driver 110 to determine the capabilities of the USB core driver stack 102. A client driver is not permitted or allowed to use a USB capability if the client driver has not verified that the USB stack supports it.

An example of this IOCTL definition is:

```
#define
    IOCTL_INTERNAL_USB_GET_USB_CAPABILITY \
        CTL_CODE (FILE_DEVICE_USB, \
        GET_USB_CAPABILITY, \
        METHOD_NEITHER, \
        FILE_ANY_ACCESS)
```

A USB client function driver 110 passes two parameters for this IOCTL, one for input and one for output. The input parameter is a caller allocated and initialized USB_CAPABILITY_REQUEST structure. The output parameter is a caller allocated buffer, which the size in bytes is specified by an OutputBufferLength field of the USB_CAPABILITY_REQUEST structure. The output buffer size is dependent on the capability type. An example of the USB_CAPABILITY_REQUEST structure is:

```
typedef struct USB_CAPABILITY_REQUEST {
        USHORT      Version;
        USHORT      Size;
        GUID        CapabilityType;
        ULONG       OutputBufferLength;
}           USB_ CAPABILITY_REQUEST,
        *PUSB_ CAPABILITY_REQUEST;
```

The Version field is the version of the structure and can be used for future extensibility. The Size field is the size of the USB_CAPABILITY_REQUEST structure and can be used for structure versioning. The CapabilityType is a GUID that represents the capability that the client driver is trying to retrieve information about.

If the client driver sends this IOCTL without first determining that the support USB interface version supports it, the IOCTL will complete with an error status, such as STATUS_INVALID_PARAMETER, STATUS_INVALID_DEVICE_REQUEST, or other such statuses that indicate an error. If this IOCTL is supported by the USB core driver stack, but the capability type is not understood or supported by the USB stack, the IOCTL will complete as STATUS_NOT_IMPLEMENTED. If the Size field of the input parameter is invalid, then the IOCTL will complete with STATUS_LENGTH_INFO_MISMATCH. If the size was greater than any supported sizes by the USB core driver stack, then the Size field can be populated to the largest value supported by the USB stack. If the output buffer length is less than needed for a particular capability type, then the IOCTL can indicate STATUS_BUFFER_TOO_SMALL. If the IOCTL completes successfully, then the capability type is understood, and the output buffer contains the capability details.

The following table lists some of the defined capability types, and the respective output contents in accordance with embodiments of extensions for USB driver interface functions as described herein:

| Capability Name | Output | Description |
| --- | --- | --- |
| UsbCapabilityChainedMdls | None | If the request completes successfully, then the stack supports URBs with multiple MDLs. |
| UsbCapabilityBasicStreams | ULONG | If the request completes successfully, then the output will be the maximum number of streams supported per endpoint. |
| UsbCapabilityFunctionSuspend | None | If the request completes successfully, then the stack supports function suspend for that device. |
| UsbCapabilityDeviceSpeed | USBD_SPEED (enum of speeds) | If the request completes successfully, then the output will be one of the valid USBD_SPEED values indicating the current operating bus speed for that device. |
| UsbCapabilityFunctionSuspend | None | If the request completes successfully, then the stack supports function suspend. This is intended to be used only by USBCCGP drivers. |
| UsbCapabilitySelectiveSuspend | None | If this request completes successfully, then the stack supports selective suspend. This is intended to be used only by USBCCGP drivers. |

The following is an example function that can be utilized to initialize the USB_CAPABILITY_REQUEST structure.

```
UsbBuildCapabilityRequest (
    __in      GUID                      CapabilityType,
    __in      ULONG                     OutputBufferLength,
    __out     PUSB_CAPABILITY_REQUEST   CapabilityRequest
    )
{
    RtlZeroMemory (CapabilityRequest, sizeof (USB_ CAPABILITY_REQUEST);
    CapabilityRequest ->Version = 0x0100;
    CapabilityRequest ->Size = sizeof (USB_ CAPABILITY_REQUEST);
    CapabilityRequest ->CapabilityType = CapabilityType;
    CapabilityRequest ->OutputBufferLength = OutputBufferLength;
}
```

The composite device driver 112 can receive this IOCTL and determine the capability request. The composite device driver can be implemented to first validate the integrity of the capability request itself, and fail the request if necessary. If the capability type is implemented within the composite device driver, then the composite device driver can perform actions to complete the request. Otherwise, the composite device driver can populate the Argument4 with the UsbdFunctionHandle for a specific function. The USB hub driver 108 can perform the same or similar steps as the composite device driver 112 with the exception of populating the UsbdDeviceHandle field before forwarding it down the USB core driver stack.

For host controller class extension handling, the class extension can receive this IOCTL on the root hub PDO and perform similar actions as the USB hub driver and the composite device driver, but rather than forwarding the IOCTL down the USB stack, call the EvtHCDControllerGetCapability routine in the USB host controller driver. If the EvtHCDControllerGetCapability call returns with a failure, the class extension will complete the IOCTL with that failure code. If the call returns with success, the class extension may modify the contents of the output buffer, and then complete the IOCTL with STATUS_SUCCESS. If the host controller driver does not provide an EvtHCDControllerGetCapability function, then the class extension will fail an IOCTL with an unknown capability type by STATUS_NOT_IMPLEMENTED.

For host controller driver handling, the USB host controller driver can receive the details of a capability request with a call to its EvtHCDControllerGetCapability call. If the USB host controller driver does not support the capability type, it will return STATUS_NOT_IMPLEMENTED. If the USB host controller driver can determine the capability type, it will validate the output buffer size and return STATUS_BUFFER_TOO_SMALL if the size is insufficient for the capability type. Otherwise, the USB host controller driver can populate the output buffer with the appropriate capability information. Just as in every other layer of the USB core driver stack, the USB host controller driver may need to enforce that it does not expose functionality if a USB client function driver has not queried the appropriate capabilities.

In various embodiments, a USB host controller supports a feature for buffered data of an input/output process that is stored in virtually non-contiguous buffers. In one implementation, the USB host controller supports MDL (Memory Descriptor List) for buffered data that is stored in virtually non-contiguous buffers. Some current USB host controller hardware interface designs have strict requirements on the buffers in a transfer and require that a buffer be virtually contiguous. There are, however, several classes of devices for which this limitation may have a significant performance impact.

In an embodiment, a USB host controller can be implemented to provide that buffers that define a transfer do not need to be virtually contiguous. Further, there are no restrictions to number, size, or alignment of buffers that make up a transfer. For a USB client function driver 110 to take advantage of this feature, the client driver detects whether the USB core driver stack 102 and USB controller support it, and then determines how to send the separate buffer segments. Before a client driver can use multiple buffer segments in a transfer, the client driver first determines if the USB stack supports this feature. The client driver can first send the version negotiation IOCTL (as described above). If the negotiated interface version is less than a particular version identifier, the client driver determines that chained buffer segments are not supported. Otherwise, the client driver then determines whether this specific capability is supported. To further validate that the feature is supported, the client driver can issue the IOCTL_INTERNAL_USB_GET_USB_CAPABILITY to determine USBCapabilityChainedMDLs capability. If this request fails, then the client driver determines that buffer chaining is unsupported. If the IOCTL completes successfully, then the client driver determines that buffer chaining is supported by the USB core driver stack and USB host controller.

Buffer chaining is natively supported by MDLs in an existing implementation of an operating system. Each MDL has a Next pointer that points to another MDL. A device driver can build this chain by manually manipulating this Next pointer field to build the list of MDLs in the proper order. In the network adapter example, the USB client function driver receives the network packet from NDIS (which may already be an MDL). To add a header, the client driver creates another MDL and populates the buffer with the header data. It will then point the new MDLs Next pointer to point to the payload MDL received from NDIS. If the client driver adds a footer, for example, it can alter the chain such that a new MDL with the footer contents is the last element in the chain. When the client driver sends this MDL chain down to the USB stack, it simply points the TransferBufferMDL field of the URB to the first MDL in the chain, and sets the TransferBufferLength field to the total sum of the segments to transfer.

For the USB core driver stack 102, the version negotiation is handled as described above. The USBCapabilityChainedMDL is handled by the USB host controller driver itself, as that is the layer in the USB core driver stack that tracks the DMA capabilities of the USB controller. The USB stack can indicate that it supports this capability. The class extension can then save this capability information with the device handle for further validation. When a URB_BULK_OR_INTERRUPT_TRANSFER is sent down the USB stack, it is not handled by any layer until the host controller class extension (with the exception of populating the function handle or device handle). When the class extension receives this URB on the root hub PDO, it may validate that the client driver had received a successful USBCapabilityChainedMDL capability request. If the client driver did not, then the class extension can validate that the Next pointer in the MDL is NULL. If not, the class extension will fail the request with a STATUS_INVALID_PARAMETER. Otherwise it will simply forward the URB to the appropriate endpoint queue.

In various embodiments, the USB core driver stack 102 can be implemented to allocate multiple data stream queues to an endpoint for an input/output process, and associate unique identifiers of the multiple data stream queues to manage the input/output. The unique identifiers of the multiple data stream queues may include handles, pointers, indices, and/or an array of any of the unique identifiers. An extension for the USB driver interface functions supports the streams feature that provides for bulk endpoints, which allows multiple input/output queues to be associated to the endpoint. A USB client function driver 110 can then control which of the many queues to move data to or from at any given time. From the software point of view, this is analogous to having many endpoints with the same characteristics. The input/output between different streams is not serialized as with separate bulk endpoints. Scheduling input/output for a stream is similar to scheduling input/output for an endpoint.

In an embodiment, an endpoint can support up to 16K streams and, to support this many streams without common buffer allocations greater than a page, the XHCI specification implements a level of indirection through secondary stream arrays. A single primary stream array can support up to two-hundred fifty-five (255) streams in a single page (e.g., each stream context is sixteen bytes and the first stream context is reserved). In an implementation, the USB core driver stack 102 limits the number of supported streams to two-hundred fifty-five (255) for controller manageability, and is represented by a simplified, limited interface referred to as the Basic Streams Interface. Through the Basic Stream Interface, a USB client function driver can retrieve a pipe handle for each stream, and reuse the existing URBs and IOCTLs that use a pipe handle for streams. This includes URB_FUNCTION_ABORT_PIPE and URB_FUNCTION_BULK_OR_INTERRUPT_TRANSFER. The operation for URB_FUNCTION_RESET_PIPE applies to the endpoint as a whole and not a stream, and a USB client function driver can opt to send URB_FUNCTION_ABORT_PIPE to the endpoint as a whole.

A USB client function driver 110 can initially issue a URB_FUNCTION_SELECT_CONFIGURATION in which there is a set of pipe handles returned back, one for each endpoint. For an endpoint that supports streams, the pipe handle returned back will represent the endpoint. However, any input/output sent with that handle (e.g., until streams are initialized) will be scheduled for the first stream (i.e., stream number 1). This provides that the client driver can utilize a stream endpoint just like a non-stream endpoint, which will allow a client USB device to be backwards compatible with a USB client function driver that is not implemented for streams. However, while an endpoint has streams open, input/output to the endpoint pipe handle will fail (with the exception of URB_FUNCTION_ABORT_PIPE and URB_FUNCTION_RESET_PIPE).

The mechanisms described above can be used to determine if a USB client function driver 110 can leverage the capability. A client driver can first send the version negotiation IOCTL (as described above). If the negotiated interface version is less than a particular version identifier, the client driver determines that streams are not supported. Otherwise the client driver then determines if this specific capability is supported. To further validate that the feature is supported, the client driver can issue the IOCTL_INTERNAL_USB_GET_USB_CAPABILITY to determine USBCapabilityBasicStreams capability. If this request fails, then the client driver determines that streams are unsupported. If the IOCTL completes successfully, then the capability value will be the non-zero maximum number of streams that the USB core driver stack and USB controller can support.

The extensions for the USB driver interface functions to open Basic Streams is the structure URB_FUNCTION_OPEN_BASIC_STREAMS and to close Basic Streams is the structure URB_FUNCTION_CLOSE_BASIC_STREAMS. The structure URB_FUNCTION_OPEN_BASIC_STREAMS is implemented for a USB client function driver 110 to implement streams by retrieving the pipe handles for the streams. The client driver can initialize this URB, passing the PipeHandle for the endpoint supporting streams, and an array to receive stream information. An example URB_FUNCTION_OPEN_BASIC_STREAMS structure is:

```
struct URB_OPEN_BASIC_STREAMS {
    STRUCT URB_HEADER         Hdr;
    USBD_PIPE_HANDLE          PIPEHANDLE;
    ULONG                     NumberOfStreams;
    USHORT                    StreamInfoVersion;
    USHORT                    StreamInfoSize;
    PUSBD_STREAM_INFORMTION   Streams;
}
```

The Hdr field is a URB_HEADER structure that specifies the URB header information. A Hdr.Length is the size of the entire URB in bytes and a Hdr.Function is the URB_FUNCTION_OPEN_BASIC_STREAMS. The PipeHandle field is the USBD_PIPE_HANDLE returned in a previous URB_FUNCTION_SELECT_CONFIGURATION or returned in a previous URB_FUNCTION_SELECT_INTERFACE. The NumberOfStreams indicates the number of streams to be configured, and also reflects the number of entries in the a streams array. This value is greater than zero and less than or equal to the maximum number of streams supported by either the USB stack or the endpoint (whichever is smaller). The StreamInfoVersion is the version of the USBD_STREAM_INFORMATION version, and this field is used for structure versioning. This field is initialized by the caller before sending it down in a URB. The StreamInfoSize is the size of the USBD_STREAM_INFORMATION structure, and this field is used for structure versioning. This field is also initialized by the caller before sending it down in a URB. The Streams field is a pointer to a caller allocated and initialized array to receive the information about the streams, including the pipe handles.

An example of the USBD_STREAM_INFORMATION structure is:

```
typedef Struct URB_STREAM_INFORMATION {
         USBD_PIPE_HANDLE    PIPEHANDLE;
         ULONG               StreamID;
         ULONG               MaximumTransferSize;
         ULONG               PipeFlags;
} USBD_STREAM_INFORMATION,
  *PUSBD_STREAM_INFORMATION
```

In this structure, the PipeHandle is the pipe handle for the stream which can be used in further URBs to send input/output to the specific stream. The StreamID is the identifier that will be sent over the USB bus for input/output related to the specific stream. The MaximumTransferSize defines the maximum transfer size that can be sent in a single URB. The PipeFlags is reserved for future information related to the stream.

If a USB client function driver sends this URB prior to receiving a non-zero value back for the USBCapabilityBasicStreams request, the URB will be completed with USBD_STATUS_INVALID_URB_FUNCTION and the IRP will be completed with STATUS_INVALID_PARAMETER. If the StreamInformationVersion field of the URB does not match a supported structure version, the IRP will be failed with STATUS_INVALID_PARAMETER, and the URB will be failed with USBD_STATUS_INVALID_PARAMETER. If the StreamInformationSize field isn't a legal value, then the IRP will be completed with STATUS_INFO_LENGTH_MISMATCH, and the URB completed with USBD_STATUS_INFO_LENGTH_MISMATCH. If the StreamInformationSize field is larger than any supported by the USB stack, then it will be populated with the maximum size supported by the USB stack and the rest of the fields will not be populated and/or modified.

If a USB client function driver sends this URB to an endpoint that does not support streams, the URB will be completed with USBD_STATUS_INVALID_PIPE_HANDLE and the IRP will be completed with STATUS_INVALID_PARAMETER. If the NumberOfStreams field exceeds the maximum number supported by the controller or the endpoint, or if the NumberOfStreams field is zero, the URB will be completed with USBD_STATUS_INVALID_PARAMETER, and the IRP will be completed with STATUS_INVALID_PARAMETER. If the NumberOfStreams field is non-zero, and streams are already configured for that endpoint, then the URB will be completed with USBD_STATUS_INVALID_PARAMETER, and the IRP will be completed with STATUS_INVALID_PARAMETER. If the URB is otherwise malformed, the URB will be completed with USBD_STATUS_INVALID_PARAMETER, and the IRP will be completed with STATUS_INVALID_PARAMETER. If the URB completes successfully, the URB status will be USBD_STATUS_SUCCESS, and the IRP will be completed with STATUS_SUCCESS. In this case, all of the stream information structures will have been populated by the USB core driver stack with valid handles and the appropriate information.

The following is an example function can be utilized to build the Open Streams URB.

```
UsbBuildOpenBasicStreamsRequest (
         __in     USBD_PIPE_HANDLE            PipeHandle,
         __in     ULONG                       NumberOfStreams,
         __in     PUSBD_STREAM_INFORMATION    StreamInfoArray,
         __out    PURB_OPEN_STREAMS           Urb;
         )
{
    RtlZeroMemory (Urb, sizeof (struct URB_Open_BASIC_STREAMS));
    Urb->UrbHeader.Function = URB_FUNCTION_OPEN_BASIC_STREAMS;
    Urb->Header.Length = sizeof (struct URB_OPEN_BASIC_STREAM);
    Urb->PipeHandle = PipeHandle;
    Urb->NumberOfStreams = NumberOfStreams;
    Urb->StreamInfoVersion = 0x0100;
    Urb->StreamInfoSize = sizeof (USBD_STREAM_INFORMATION);
    Urb->Streams = StreamInforArray;
    RtlZeroMemory (StreamInfoArray,
         sizeof(USBD_STREAM_INFORMATION) * NumberOfStreams;
}
```

The composite device driver 112 can populate the USBDFunctionHandle in Argument4 of the URB IOCTL, and the USB hub driver 108 populates the USBDDeviceHandle field in the URB. When handling the IOCTL_INTERNAL_USB_GET_USB_CAPABILITY for USBCapabilityBasicStreams, a USB host controller class extension can permit streams to be enabled and it will call the EvtControllerGetCapability routine to allow the USB host controller driver to handle the request. The class extension will then save this capability value and associate it with the device handle. When receiving a URB_FUNCTION_OPEN_BASIC_STREAMS, the class extension validates that the USBCapabilityBasicStreams has been returned with a non-zero value. If not, it fails the URB with USBD_STATUS_INVALID_URB_FUNCTION. If the NumberOfStreams in the URB is greater than was returned in the USBCapabilityBasicStreams, or if it is zero, then it fails the URB with USBD_STATUS_INVALID_PARAMETER. The class extension can be implemented for additional URB validation to verify that the URB is well formed and that the number of streams is valid for that particular endpoint. If streams were already opened for specified endpoint, the class extension fails the URB with USBD_STATUS_INVALID_PIPE_HANDLE.

Assuming that the URB is well formed, the class extension can call the controller driver's EvtHCDEndpointCreateStream function for each stream, which will return the pipe handles. If one of these StreamCreate calls fails, the class extension will free all of the already allocated streams and complete the URB with USBD_STATUS_INSUFFICENT_RESOURCES. If all of the streams are successfully created, then the class extension will call the driver's EvtHCDEndpointOpenStreams function to open the streams. If this operation fails, the URB can be completed with the appropriate status (as returned by the driver). If the operation succeeds, then the class extension can fill in the stream information in the URB and complete the URB successfully.

For XHCI driver handling, the XHCI driver's EvtHCDUSBDeviceConfigureEndpoints is called and when it encounters an endpoint that supports streams, it will allocate an initial stream context array to hold a single stream. The endpoint code associated with the WDFQUEUE created for that endpoint would need to know that the endpoint input/output should actually go to a transfer ring associated with the stream. When the class extension calls the XHCI driver's EvtHCDEndpointCreateStream, the class extension will create a new WDFQUEUE object to represent the stream itself and it will initialize the queue's context to save data about the stream. When the class extension calls EvtHCDEndpointOpenStreams, the XHCI driver allocates a bigger stream context array, and sends a Configure Endpoint command to the controller with the remove and add flags for that endpoint set. This replaces the context array and the number of streams configured for the endpoint. At this point, the WDFQUEUE that represents the endpoint should no longer accept input/output as it no longer represents a valid stream. It can, however, be the target of an abort pipe or reset pipe. When the class extension calls EvtHCDEndpointCloseStreams, the XHCI driver can swap the stream context arrays using the ConfigureEndpoint command, and reconfigure the endpoint's WDFQUEUE to be able to target the first stream (i.e., stream 1).

The structure URB_FUNCTION_CLOSE_BASIC_STREAMS is implemented so that a USB client function driver that has opened streams will be able to close the stream handles. A client driver can initialize this URB, passing the PipeHandle for the endpoint supporting streams. This URB uses the URB_PIPE_REQUEST structure. If a client driver sends this URB prior to receiving a non-zero value back for the USBCapabilityBasicStreams request, the URB will be completed with USBD_STATUS_INVALID_URB_FUNCTION and the IRP will be completed with STATUS_INVALID_PARAMETER. If a client driver sends this URB to an endpoint that does not currently have any open streams, then the URB will be completed with USBD_STATUS_INVALID_PIPE_HANDLE and the IRP will be completed with STATUS_INVALID_PARAMETER. If the URB is otherwise malformed, the URB will be completed with USBD_STATUS_INVALID_PARAMETER, and the IRP will be completed with STATUS_INVALID_PARAMETER. If the URB completes successfully, the URB status will be USBD_STATUS_SUCCESS, and the IRP will be completed with STATUS_SUCCESS.

The composite device driver 112 can populate the USBDFunctionHandle in Argument4 of the URB IOCTL. The USB hub populates the USBDDeviceHandle field in the URB. When receiving a URB_FUNCTION_CLOSE_BASIC_STREAMS, the USB host controller class extension validates that the endpoint currently has streams open. If not, the URB is completed with an error. The class extension can perform additional URB validation to verify that the URB is well formed. Assuming that the URB is well formed, the class extension can call the device driver's EvtHCDEndpointAbort to flush all of the input/output to the streams (i.e., after stopping the stream queues), and then call EvtHCDEndpointCloseStreams. It can later dereference the WDFQUEUEs to cause the stream queues to be cleaned up. When the class extension calls EvtHCDEndpointCloseStreams, the XHCI driver can swap the stream context arrays using the ConfigureEndpoint command, and reconfigure the endpoint's WDFQUEUE to be able to target the first stream (i.e., stream 1).

Example methods 200, 300, 400, and 500 are described with reference to respective FIGS. 2, 3, 4, and 5 in accordance with one or more embodiments of extensions for USB driver interface functions. Generally, any of the functions, methods, procedures, components, and modules described herein can be implemented using hardware, software, firmware, fixed logic circuitry, manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The methods may also be practiced in a distributed computing environment by processing devices that are linked through a communication network. In a distributed computing environment, computer-executable instructions may be located in both local and remote computer storage media and/or devices. Further, the features described herein are platform-independent and can be implemented on a variety of computing platforms having a variety of processors.

Figure 2:
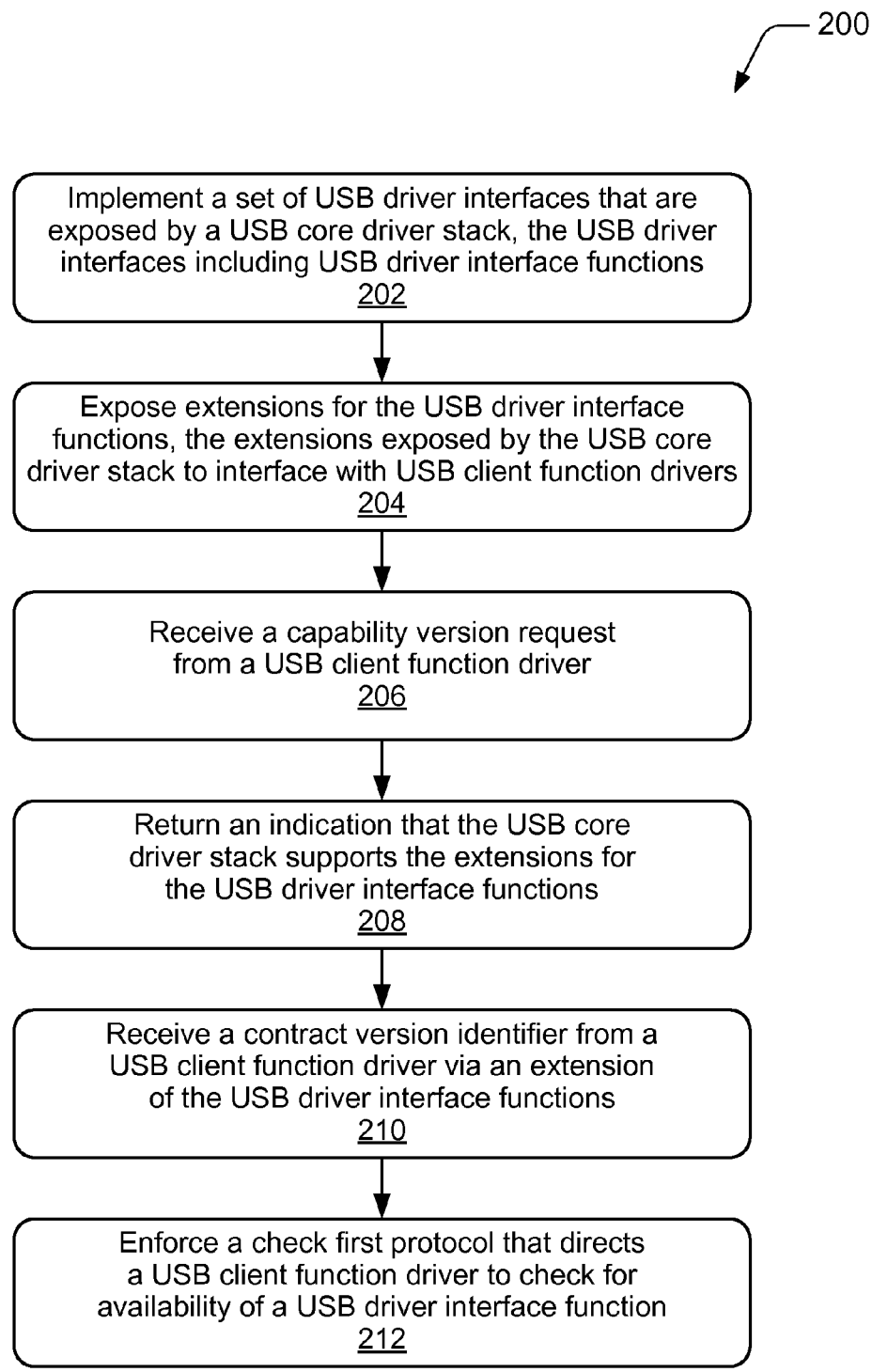
FIG. 2 illustrates example method(s) of extensions for USB driver interface functions in accordance with one or more embodiments.

FIG. 2 illustrates example method(s) 200 of extensions for USB driver interface functions. The order in which the method blocks are described are not intended to be construed as a limitation, and any number of the described method blocks can be combined in any order to implement a method, or an alternate method.

At block 202, a set of USB driver interfaces that are exposed by a USB core driver stack are implemented, and the USB driver interfaces include USB driver interface functions. For example, the USB driver interfaces (APIs) 114 are exposed by the USB core driver stack 102, and the USB driver interfaces 114 include USB driver interface functions. The APIs are implemented and exposed by the USB core driver stack for use by the USB client function drivers 110 and/or the composite device driver 112. The USB core driver stack 102 manages the input/output of computer instructions and data exchange for USB client function drivers 110.

At block 204, extensions for the USB driver interface functions are exposed by the USB core driver stack to interface with USB client function drivers. For example, the extensions 116 for the USB driver interface functions are exposed by the USB core driver stack 102 to interface with the USB client function drivers 110 and/or the composite device driver 112.

At block 206, a capability version request is received from a USB client function driver. For example, a USB client function driver 110 requests a capability version request from the USB core driver stack via an extension 116 of the USB driver interface functions. At block 208, an indication is returned that the USB core driver stack supports the extensions for the USB driver interface functions. For example, an indication is returned to the requesting USB client function device 110 that the USB core driver stack 102 and the USB host controller driver library 106 support the extensions 116 for the USB driver interface functions.

At block 210, a contract version identifier is received from a USB client function driver via an extension of the USB driver interface functions. For example, the USB core driver stack 102 receives a contract version identifier from a USB client function driver 110, and the contract version identifier indicates a set of operation rules by which the USB client function driver interfaces with the USB core driver stack. In an implementation, there are two version values exchanged. One value for the USB client function driver 110 to determine whether the USB stack supports the extensions 116 (e.g., the extended APIs). The other value is for the USB core driver stack 102 to determine how to function in order to guarantee compatibility with older USB client function drivers while still allowing it to function more optimized for newer function drivers.

At block 212, a check first protocol is enforced that directs a USB client function driver to check for availability of a USB driver interface function. For example, the USB core driver stack 102 enforces the check first protocol that directs a USB client function driver 110 to check for availability of a USB driver interface function and/or extension 116 before interfacing with the USB core driver stack via the USB driver interfaces 114.

Figure 3:
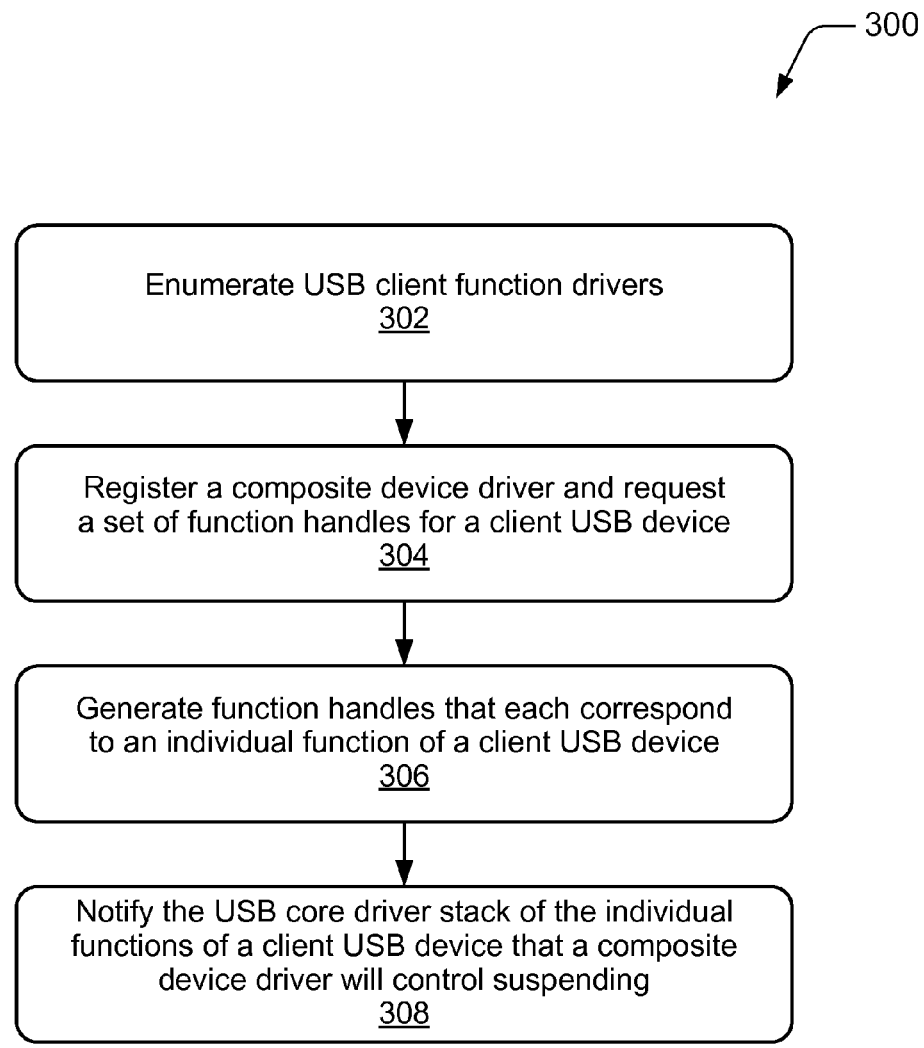
FIG. 3 illustrates additional example method(s) of extensions for USB driver interface functions in accordance with one or more embodiments.

FIG. 3 illustrates example method(s) 300 of extensions for USB driver interface functions. The order in which the method blocks are described are not intended to be construed as a limitation, and any number of the described method blocks can be combined in any order to implement a method, or an alternate method.

At block 302, USB client function drivers are enumerated. For example, the USB core driver stack 102 enumerates the USB client function drivers 110. At block 304, a composite device driver registers itself and requests a set of function handles for a client USB device. At block 306, function handles that each correspond to an individual function of the client USB device are generated. For example, the composite device driver 112 registers individual functions of the one or more client USB devices, and the USB core driver stack 102 generates function handles that each correspond to an individual function of a client USB device.

At block 308, the USB core driver stack is notified of the individual functions of a client USB device that a composite device driver will control suspending. For example, the composite device driver 112 notifies the USB core driver stack 102 of the individual functions of the various client USB devices that the composite device driver 112 will control suspending. Once all of the functions of a client USB device are suspended, the composite device driver 112 can request that the client USB device be suspended. This request is to the USB hub driver 108, which then suspends the client USB device. The individual functions of a client USB device can be independently notified of a suspend.

This is the mechanism by which the composite device driver 112 (e.g., a USB CCGP or equivalent driver) notifies the USB stack that it will be responsible for suspending functions, thus relieving the USB hub driver 108 from doing this at the device level. With function suspend, as soon as a client driver sends a request to be notified when it can power down, the composite device driver 112 can notify the client driver immediately, rather than waiting for all functions of a device to request and coordinate a power down. Alternatively or in addition, a function resume or wake feature can be implemented to resume a function from a suspended state, rather than just for the device as a whole. With the function resume feature, an individual function can be armed for resume which is accomplished by sending a command to a function on the device to notify it that it is allowed to initiate resume. The composite device driver can perform this arming operation itself without going through the USB hub driver 108 (i.e., this responsibility to arm a function is implemented at the composite device driver 112).

Figure 4:
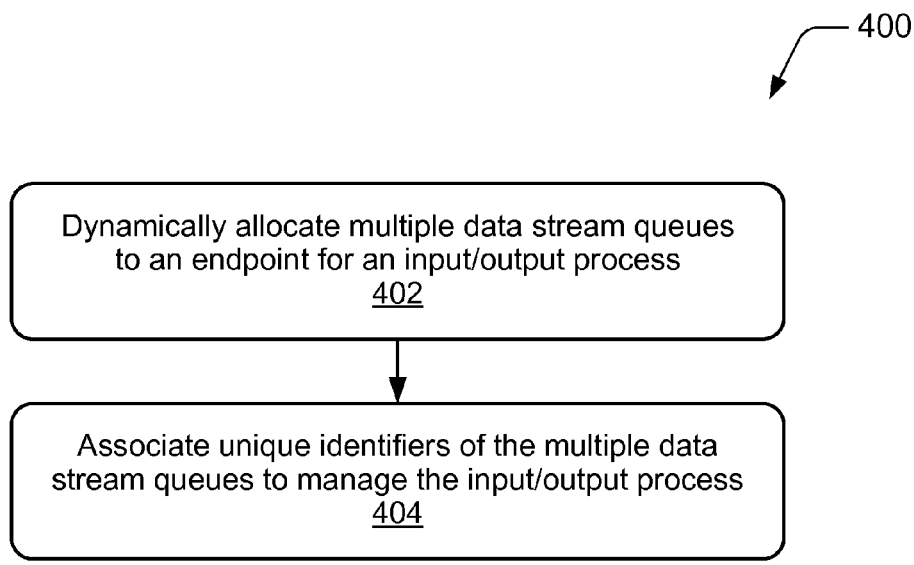
FIG. 4 illustrates additional example method(s) of extensions for USB driver interface functions in accordance with one or more embodiments.

FIG. 4 illustrates example method(s) 400 of extensions for USB driver interface functions. The order in which the method blocks are described are not intended to be construed as a limitation, and any number of the described method blocks can be combined in any order to implement a method, or an alternate method.

At block 402, multiple data stream queues are allocated to an endpoint for an input/output process and, at block 404, unique identifiers of the multiple data stream queues are associated to manage the input/output process. For example, embodiments of extensions for USB driver interface functions support streams to allocate multiple data stream queues to an endpoint which provides that multiple input/output queues can be associated to a bulk endpoint. The unique identifiers of the multiple data stream queues may include handles, pointers, indices, and/or an array of any of the unique identifiers.

Figure 5:
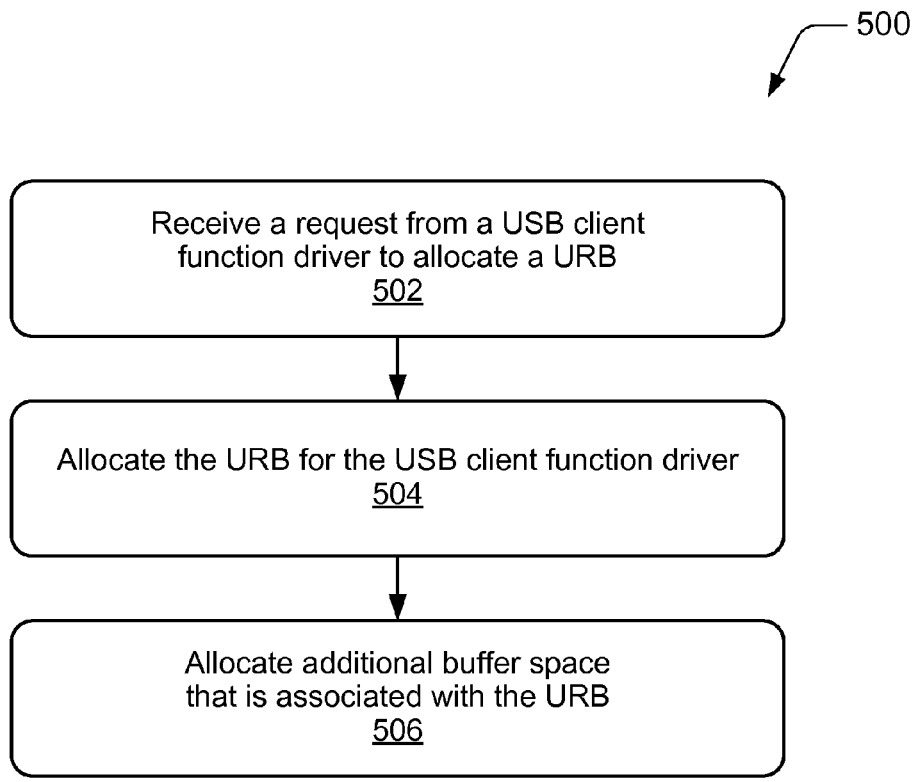
FIG. 5 illustrates additional example method(s) of extensions for USB driver interface functions in accordance with one or more embodiments.

FIG. 5 illustrates example method(s) 500 of extensions for USB driver interface functions. The order in which the method blocks are described are not intended to be construed as a limitation, and any number of the described method blocks can be combined in any order to implement a method, or an alternate method.

At block 502, a request is received from a USB client function driver to allocate a URB (USB request block) and, at block 504, the URB is allocated for the USB client function driver. For example, the composite device driver 112 receives a request from a USB client function driver 110 to allocate a URB and the USB core driver stack 102 allocates the URB for the USB client function driver.

At block 506, additional buffer space that is associated with the URB is allocated. For example, the USB core driver stack 102 allocates additional buffer space that is associated with the URB. The USB core driver stack 102 can utilize the additional buffer space to manage the input/output associated with the USB client function driver, such as for track versioning, verification, to enforce contracts, optimize code paths, tune USB stack behavior to client driver behavior, etc.

Figure 6:
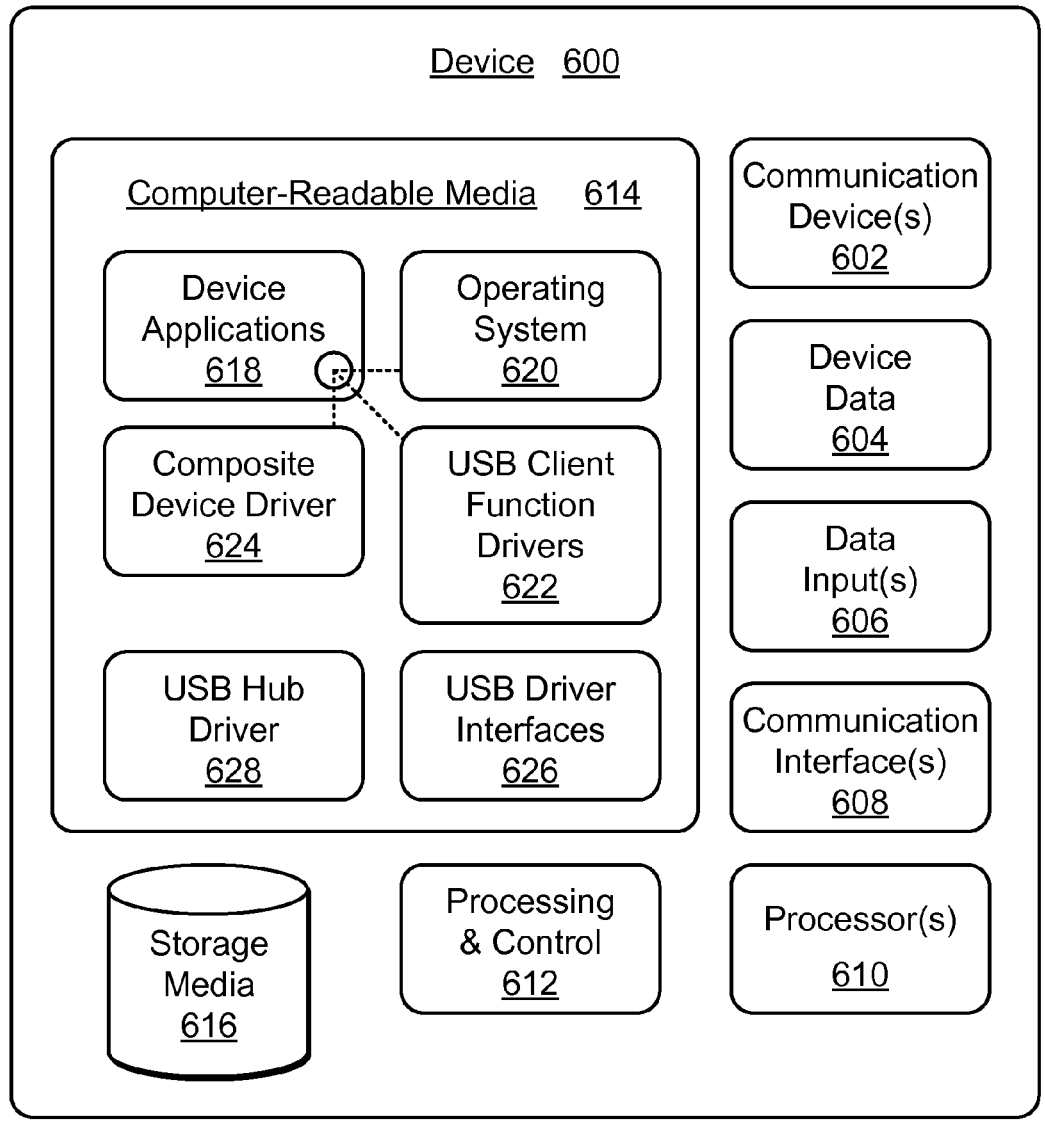
FIG. 6 illustrates various components of an example device that can implement embodiments of extensions for USB driver interface functions.

FIG. 6 illustrates various components of an example device 600 that can be implemented to include the example system described with reference to FIG. 1 in accordance with the various embodiments and features of extensions for USB driver interface functions. In embodiments, device 600 can be implemented as any one or combination of a wired and/or wireless device, as any form of consumer device, computer device, server device, portable computer device, user device, communication device, video processing and/or rendering device, appliance device, gaming device, electronic device, and/or as any other type of device. Device 600 may also be associated with a user (i.e., a person) and/or an entity that operates the device such that a device describes logical devices that include users, software, firmware, and/or a combination of devices.

Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable instructions to control the operation of device 600 and to implement embodiments of extensions for USB driver interface functions. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus (USB), and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 (e.g., to include a USB core driver stack) can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.).

The device applications 618 also include any system components or modules to implement embodiments of extensions for USB driver interface functions. In this example, the device applications 618 include USB client function drivers 622, a composite device driver 624, USB driver interfaces 626, and a USB hub driver 628. In this example, the USB client function drivers 622, composite device driver 624, USB driver interfaces 626, and the USB hub driver 628 are shown as software modules and/or computer applications. Alternatively or in addition, the USB client function drivers 622, composite device driver 624, USB driver interfaces 626, and the USB hub driver 628 can be implemented as hardware, software, firmware, or any combination thereof.

Although embodiments of extensions for USB driver interface functions have been described in language specific to features and/or methods, it is to be understood that the subject of the appended claims is not necessarily limited to the specific features or methods described. Rather, the specific features and methods are disclosed as example implementations of extensions for USB driver interface functions.

The invention claimed is:

1. A computer-implemented method, comprising:
    exposing a set of serial communication protocol driver interfaces that are exposed by a core driver stack, the serial communication protocol driver interfaces including driver interface functions configured to interface with client function drivers that correspond to one or more client devices configured for data communication in accordance with the serial communication protocol; and
    receiving a contract version identifier from a client function driver via an extension of the driver interface functions, the contract version identifier indicating a set of operation rules by which the client function driver interfaces with the core driver stack.

2. A computer-implemented method as recited in claim 1, further comprising notifying the core driver stack that a composite device driver will control suspending individual functions of a client device, the composite device driver said notifying the core driver stack via an extension of the driver interface functions.

3. A computer-implemented method as recited in claim 1, further comprising enforcing a check first protocol that directs the client function driver to check for availability of a driver interface function before interfacing with the core driver stack via the serial communication protocol driver interfaces.

4. A computer-implemented method as recited in claim 1, further comprising:
    exposing extensions for the driver interface functions, the extensions exposed by the core driver stack to interface with the client function drivers;
    receiving a capability version request from the client function driver; and
    returning an indication that the core driver stack supports the extensions for the driver interface functions.

5. A computer-implemented method as recited in claim 1, further comprising identifying a client function driver that causes a runtime failure, the client function driver being identifiable by a function handle that corresponds to an individual function of the client device that is associated with the client function driver.

6. A computer-implemented method as recited in claim 1, wherein the serial communication protocol driver interfaces comprise USB driver interfaces that include USB driver interface functions configured to interface with USB client function drivers that correspond to one or more client USB devices.

7. A computer system, comprising:
    a core driver stack configured to expose a set of serial communication protocol driver interfaces that include driver interface functions configured to interface with client function drivers that correspond to one or more client devices configured for data communication in accordance with the serial communication protocol; and
    a hardware processing system to implement the core driver stack for input/output of computer instructions and the data communication, the core driver stack further configured to receive a contract version identifier from a client function driver via an extension of the driver interface functions, the client function driver interfacing with the core driver stack based on the contract version identifier indicating a set of operation rules by which the client function driver interfaces with the core driver stack.

8. A computer system as recited in claim 7, wherein the core driver stack is further configured to notify the core driver stack that a composite device driver will control suspending individual functions of a client device, the composite device driver configured to notify the core driver stack via an extension of the driver interface functions.

9. A computer system as recited in claim 7, wherein the core driver stack is further configured to enforce a check first protocol that directs the client function driver to check for availability of a driver interface function before interfacing with the core driver stack via the serial communication protocol driver interfaces.

10. A computer system as recited in claim 7, wherein the core driver stack is further configured to expose extensions for the driver interface functions, the extensions exposed by the core driver stack to interface with the client function drivers.

11. A computer system as recited in claim 7, wherein the core driver stack is further configured to:
receive a capability version request from the client function driver; and
return an indication that the core driver stack supports the extensions for the driver interface functions.

12. A computer system as recited in claim 7, wherein the core driver stack is further configured to identify a client function driver that causes a runtime failure, the client function driver being identifiable by a function handle that corresponds to an individual function of the client device that is associated with the client function driver.

13. A computer system as recited in claim 7, wherein the serial communication protocol driver interfaces comprise USB driver interfaces that include USB driver interface functions configured to interface with USB client function drivers that correspond to one or more client USB devices.

14. A hardware computer-readable storage memory component comprising stored instructions that are executable and, responsive to execution of the instructions by a computing device, the computing device performs operations comprising to:
expose a set of serial communication protocol driver interfaces that are exposed by a core driver stack, the serial communication protocol driver interfaces including driver interface functions configured to interface with client function drivers that correspond to one or more client devices configured for data communication in accordance with the serial communication protocol; and
receive a contract version identifier from a client function driver via an extension of the driver interface functions, the client function driver interfacing with the core driver stack based on the contract version identifier indicating a set of operation rules by which the client function driver interfaces with the core driver stack.

15. A hardware computer-readable storage memory component as recited in claim 14, wherein the computing device performs operations further comprising to notify the core driver stack that a composite device driver will control suspending individual functions of a client device, the composite device driver configured to notify the core driver stack via an extension of the driver interface functions.

16. A hardware computer-readable storage memory component as recited in claim 14, wherein the computing device performs operations further comprising to enforce a check first protocol that directs the client function driver to check for availability of a driver interface function before interfacing with the core driver stack via the serial communication protocol driver interfaces.

17. A hardware computer-readable storage memory component as recited in claim 14, wherein the computing device performs operations further comprising to expose extensions for the driver interface functions, the extensions exposed by the core driver stack to interface with the client function drivers.

18. A hardware computer-readable storage memory component as recited in claim 14, wherein the computing device performs operations further comprising to:
receive a capability version request from the client function driver; and
return an indication that the core driver stack supports the extensions for the driver interface functions.

19. A hardware computer-readable storage memory component as recited in claim 14, wherein the computing device performs operations further comprising to identify a client function driver that causes a runtime failure, the client function driver being identifiable by a function handle that corresponds to an individual function of the client device that is associated with the client function driver.

20. A hardware computer-readable storage memory component as recited in claim 14, wherein the serial communication protocol driver interfaces comprise USB driver interfaces that include USB driver interface functions configured to interface with USB client function drivers that correspond to one or more client USB devices.

* * * * *